United States Patent [19]

Tatsumi et al.

[11] Patent Number: 4,899,216

[45] Date of Patent: Feb. 6, 1990

[54] METHOD OF AND APPARATUS FOR PROCESSING AN IMAGE WITH GRADATION CORRECTION OF VIDEO SIGNAL

[75] Inventors: Setsuji Tatsumi; Kazuo Shiota; Hitoshi Urabe; Osamu Shimazaki, all of Kaisei, Japan

[73] Assignee: Fuji Photo Film Co., Ltd., Kanagawa, Japan

[21] Appl. No.: 89,553

[22] Filed: Aug. 26, 1987

[30] Foreign Application Priority Data

| Sep. 2, 1986 | [JP] | Japan | 61-205173 |
| Sep. 2, 1986 | [JP] | Japan | 61-205174 |
| Sep. 2, 1986 | [JP] | Japan | 61-205175 |
| Sep. 2, 1986 | [JP] | Japan | 61-205176 |

[51] Int. Cl.$^4$ .............................................. H04N 1/46
[52] U.S. Cl. ........................................ 358/80; 358/75
[58] Field of Search ...................... 358/80, 75, 78, 280

[56] References Cited

U.S. PATENT DOCUMENTS

| 4,346,402 | 8/1982 | Pugsley | 358/80 |
| 4,371,260 | 2/1983 | Yoshimoto et al. | 358/75 X |
| 4,402,015 | 8/1983 | Yamada | 358/80 X |
| 4,410,909 | 10/1983 | Ueda et al. | 358/80 X |
| 4,573,071 | 2/1986 | Sakamoto | 358/80 X |
| 4,591,904 | 5/1986 | Urabe et al. | 358/75 |
| 4,598,282 | 7/1986 | Pugsley | 358/80 X |
| 4,639,769 | 1/1987 | Fleisher et al. | 358/80 X |
| 4,642,683 | 2/1987 | Alkofer | 358/80 |
| 4,667,228 | 5/1987 | Kawamura et al. | 358/80 |
| 4,710,822 | 12/1987 | Matsunawa | 358/280 |
| 4,727,434 | 2/1988 | Kawamura | 358/280 |
| 4,733,306 | 3/1988 | Matsunawa et al. | 358/280 |
| 4,792,847 | 12/1988 | Shimazaki et al. | 358/80 |

FOREIGN PATENT DOCUMENTS 56-77846 6/1981 Japan ................................. 358/75

Primary Examiner—James J. Groody
Assistant Examiner—Mark R. Powell
Attorney, Agent, or Firm—Birch, Stewart, Kolasch & Birch

[57] ABSTRACT

The gradation correction of input video signals is conducted in the gradation correctors based on lookup table data. The cumulative histograms of the input video signals are generated in cumulative histogram generators to set highlight points and shadow points. Based on the highlight and shadow points, the standard lookup table data stored in the standard lookup table storage is converted in lookup table data associated with the input video signals and outputted to gradation correctors. According to this method, an appropriate gradation correction can be achieved depending on the input video signals. The standard lookup table storage need only be loaded with the standard lookup table data, namely, a great volume of lookup table data need not be stored.

36 Claims, 11 Drawing Sheets

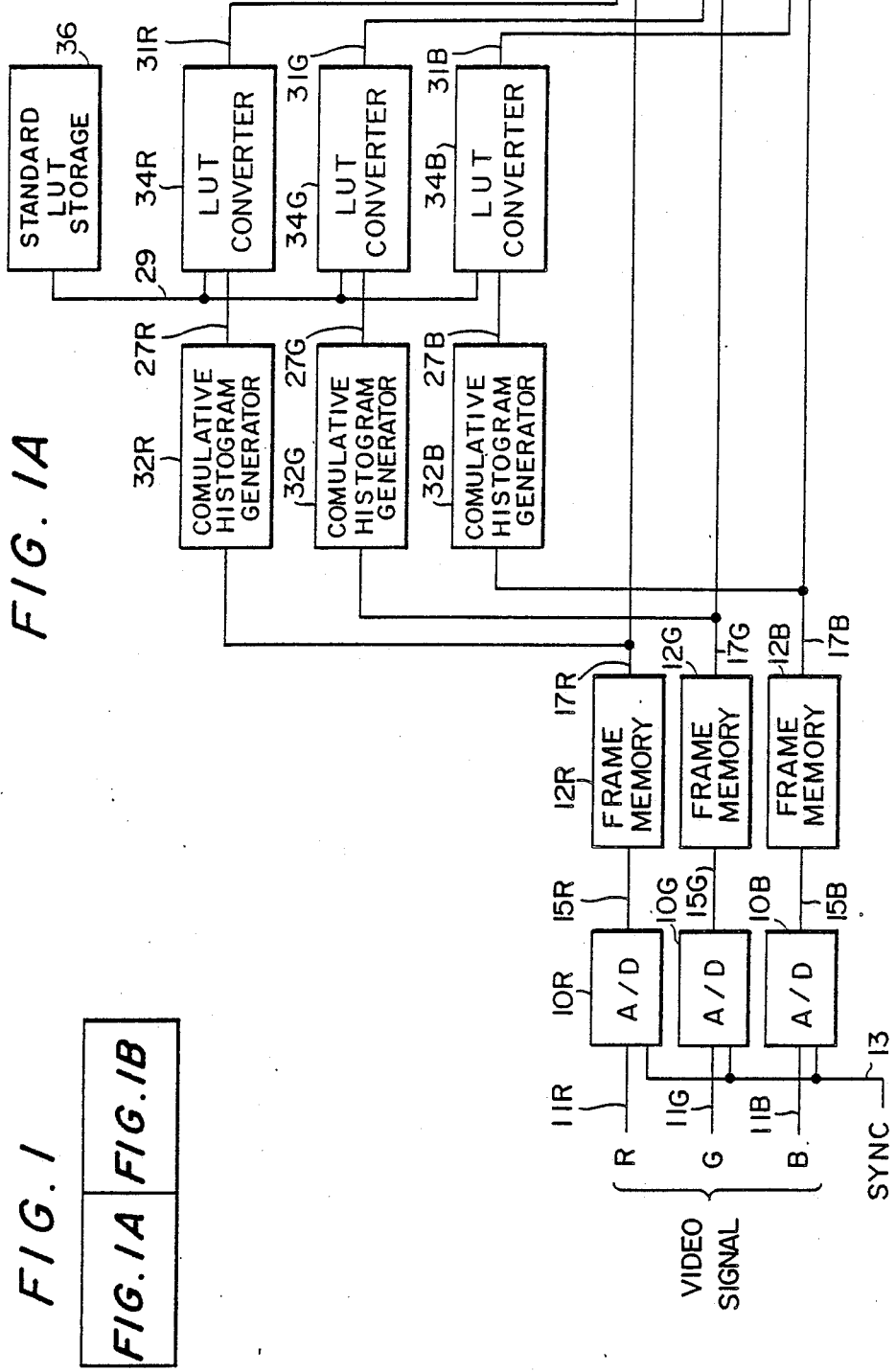

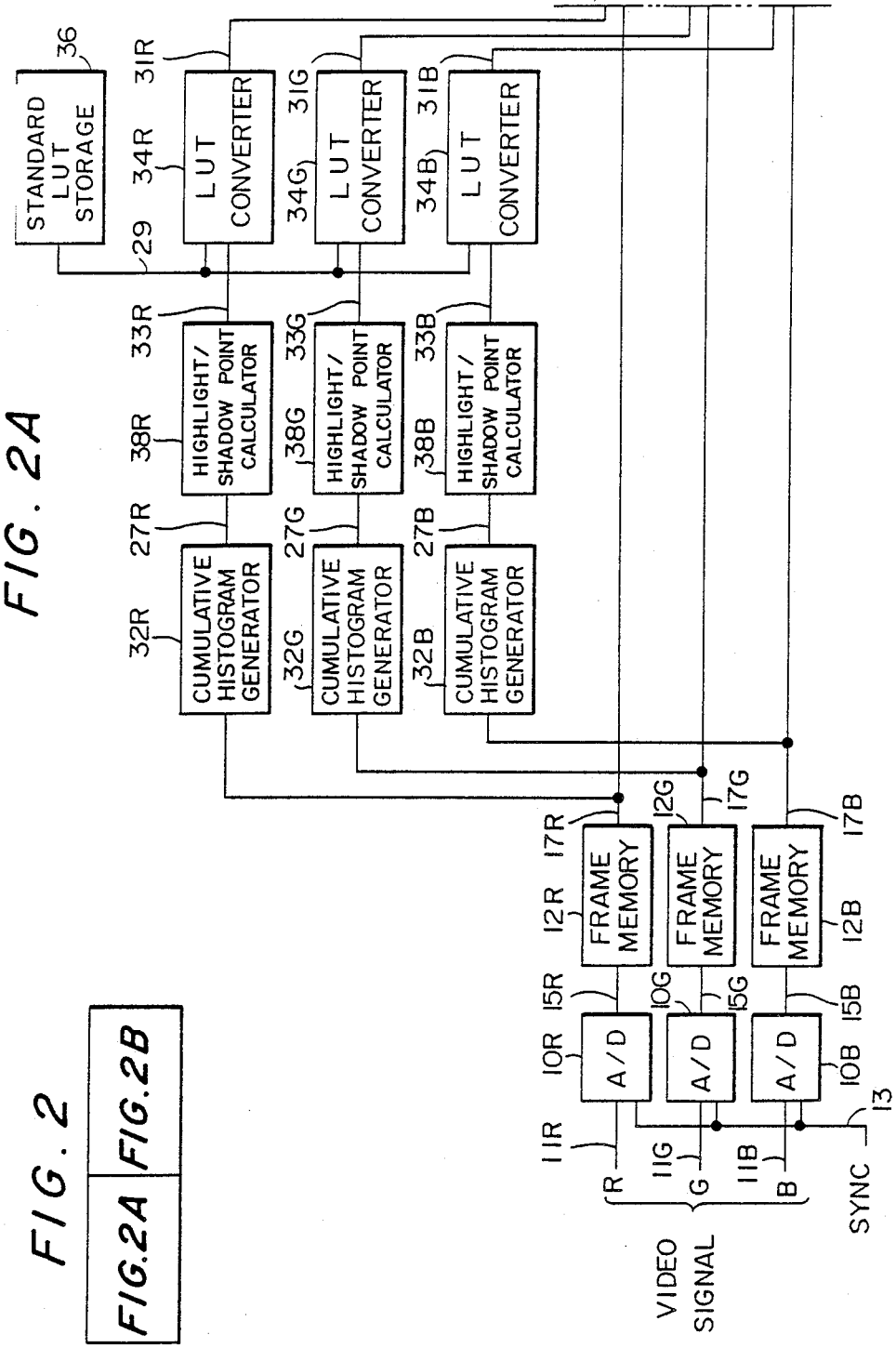

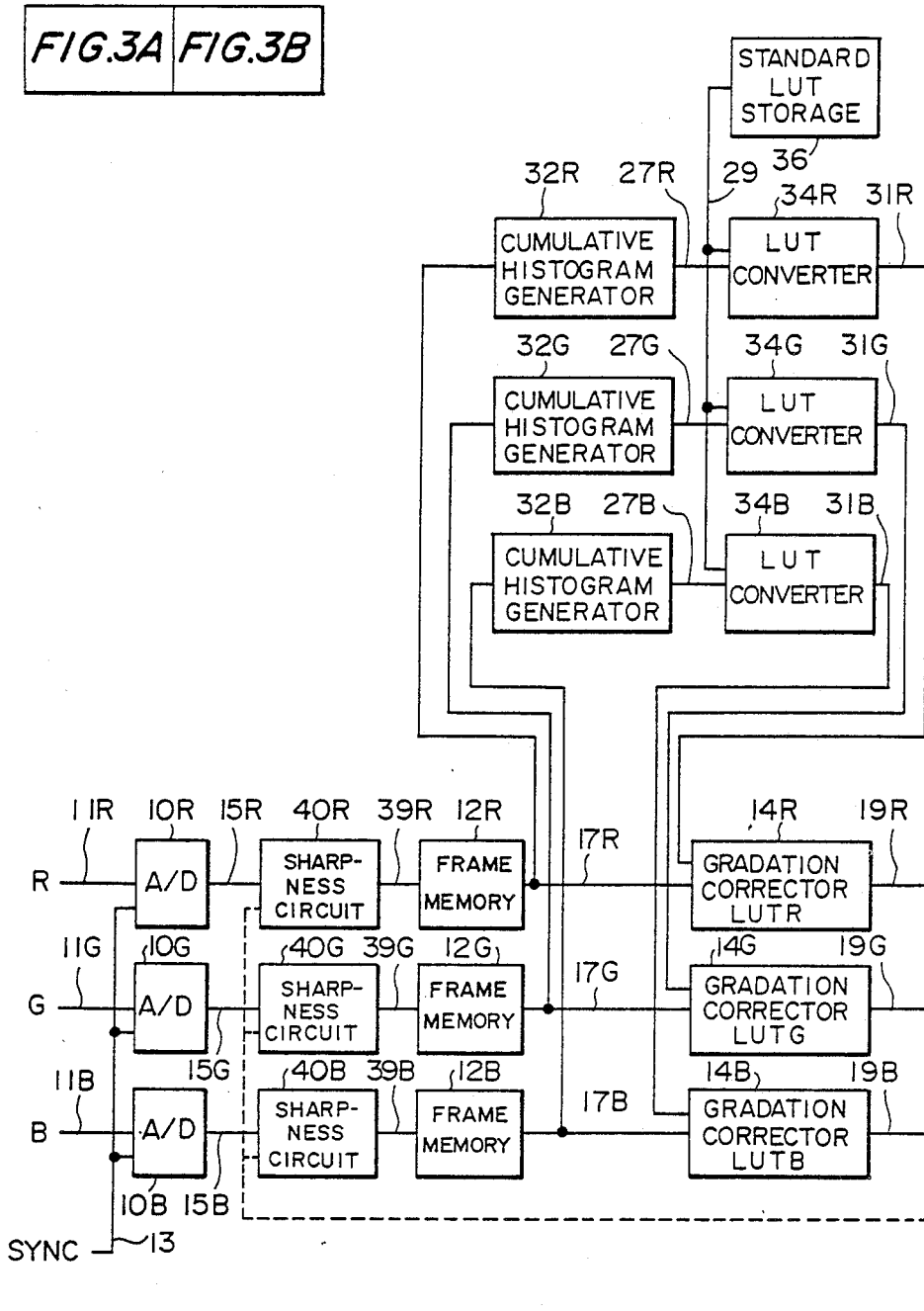

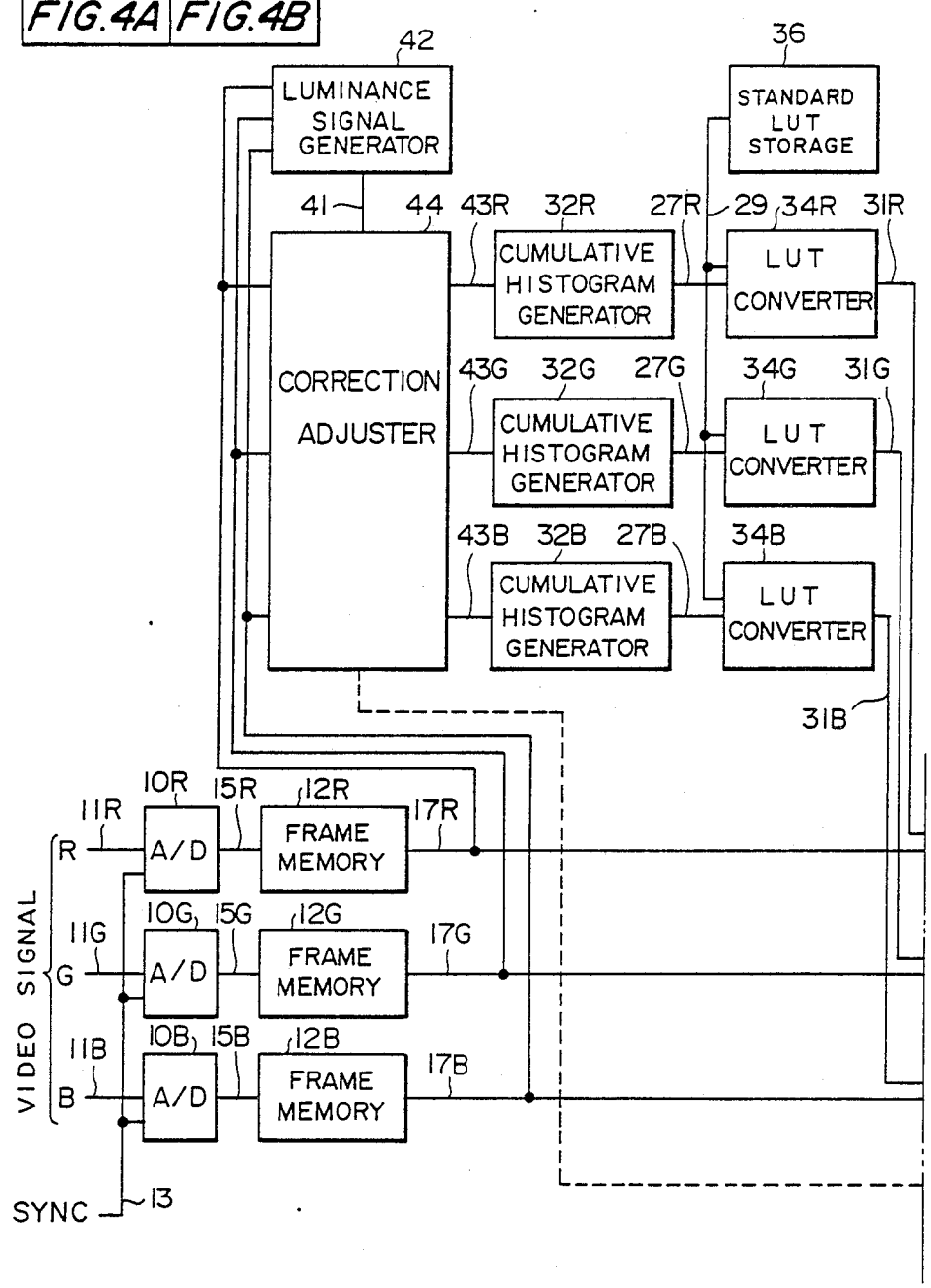

METHOD OF AND APPARATUS FOR PROCESSING AN IMAGE WITH GRADATION CORRECTION OF VIDEO SIGNAL

BACKGROUND OF THE INVENTION

1. Field of the Invention

The present invention relates to a method of and an apparatus for processing an image, and in particular, to a method of and an apparatus for processing an image in which a gradation is effectively corrected when a still image represented by a video signal is recorded in an image recording medium.

2. Description of the Prior Art

A still image recording apparatus has been proposed which receives a video signal read from an video signal recording medium, for example, a floppy disk or a video tape to reproduce a visual image on an image recording medium such as a sheet of photographic printing paper.

In such an apparatus, for example, red R, green G, and blue B signals respectively attained from the input video signal are sequentially delivered to a recording monochrome CRT having a high brightness. Before a display screen of the recording CRT, there is disposed a lens and a color-decomposing filter for separating 3 colors so as to focus an image displayed on the screen on a color printing sheet. Color components including cyan C, magenta M, and yellow Y are caused to be developed in the color printing sheet to obtain a color picture. In this case, the level must be inverted between the R, G and B signals attained from the input video signal and the signal to be supplied to the high-brightness monochrome CRT to develop the color elements C, M and Y. That is, for example, for a bright portion of an image of which the R, G and B signals have a high level, since the development of colors by the color components C, M, Y must be reduced to represent the brightness, the output level of the portion is required to be minimized.

Furthermore, for an image represented by an input video signal, since the density of each color is different from that of the actual object depending on, for example, the condition of illumination and the camera used to shoot the object, compensation is necessary in difference of the density. For example, even when the red, green and blue each have the same intensity with a white portion having the highest level in an actual object, the R, G and B signals received may respectively have different maximum levels in some cases. In such a situation, if the inputted R, G and B signals are directly used, for example, a portion which should be printed in white may be recorded on a recording medium with a color slightly shifted to any one of the red, green and blue due to the differences between the levels of the R, G and B signals.

To compensate for this phenomenon, a gradation correction has been achieved by use of a lookup table for each of the inputted R, G and B signals. Namely, a lookup table containing data of output levels associated with input signals is used to effect gradation correction, which further achieves the level reversing operation described above.

Conventionally, the data of the lookup table is established as follows.

For the R, G and B video signals attained from the input video signal, assuming points RH, GH and BH in the neighborhood of the highest points of the respective levels to represent a highlight point, and input video signal levels RH, GH and BH at the respective points are converted into the same density DH, which is a thin density similar to a density having the lowest level, thereby producing video signals at the same density.

Similarly, assuming points RS, GS and BS in the proximity of points having the respective lowest levels of the R, G and B video signals to represent a shadow point, input video signal levels RS, GS and BS at these points are converted into the same density D, which is a thin density in the vicinity of a density having the highest level, thereby producing video signals at the same level.

As described above, in a graph of an output density for an input video signal level, the highlight point and the shadow point are determined for each of the R, G and B signals, a curve is selected from a plurality of curves previously prepared, the curve having shortest distances to the highlight and shadow is selected then data on the selected curve are used as the data of lookup table to achieve the gradation correction. That is, for example, from a plurality of curves, a plurality of curves having the shortest distance to the highlight point are selected, and then from the selected curves, a curve having the smallest distance to the shadow point is selected.

The conventional lookup table data thus obtained by selecting a curve is obtained from the limited number of curves and hence it is not likely that the data when plotted correctly passes the highlight and shadow points; consequently, an error takes place, namely, for the gradation correction of an image represented by an input video signal, the lookup table data is not accurate.

Moreover, since data of many curves is stored, there arises a disadvantage that storage means with a large capacity is necessary.

The highlight and shadow points are attained, for example, by generating a cumulative histogram representing a frequency distribution of a video signal of each pixel in a frame of input video signals. For example, the highlight point is determined to be a point where a value of 99% is indicated in the cumulative histogram. That is, 99% of the input signals of the pixels have levels below the level of an input video signal associated with the highlight point.

Similarly, the shadow point is set to a point where a value of 1% is indicated in the cumulative histogram.

Consequently, in both cases where a portion of input video signals having a level in the vicinity of the level of the highlight point occupies a large area and a small area, the gradation is similarly established with the output density D in the neighborhood of the highlight point. However, since the gradation in the area near the highlight point greatly contributes to the picture quality of the overall picture, when there exists a large area having a level in the neighborhood of the level of the highlight point, the large-area portion attracts attention of the viewer of the recorded picture; consequently, it is desirable to correct the gradation to a high degree the large-area portion so that the level difference of the input video signals is magnified in the representation in terms of the output density. On the other hand, when there exists a small area having a level in the neighborhood of the level of the highlight point, the small-area portion does not attract attention of the viewer of the recorded picture and hence it is desirable not to take much account of the gradation in the small-area portion so that the level difference of the input video signals is reduced in the representation in terms of the output density, thereby producing a hard gradation in the overall picture.

In order to change the gradation in the output density depending on the area in the vicinity of the highlight point, the highlight point must be established in consideration of the area in the neighborhood of the highlight point. Similarly, the area must be taken into consideration to set the shadow point.

Conventionally, however, since the highlight and shadow points are respectively fixedly set to the 99% and 1% points in the cumulative histogram as described above, an appropriate gradation correction cannot be effected with the area taken into consideration.

Moreover, since the highlight and shadow points are set only to the 99% and 1% points in the cumulative histogram, when the number of sampling points is reduced to generate the cumulative histogram, the highlight and shadow points are under the influence of noise and contour emphasis, which prevents a proper gradation correction.

On the other hand, in a method in which reference is made to the overall frequency distribution in a histogram to attain a normalized distribution in the histogram, an area with an intermediate density is also referenced, which leads to a strong dependency on a scene and hence to an unnatural picture; consequently, the correct color balance cannot be developed in many cases.

Incidentally, the data of the lookup table in a case where a picture includes a white portion is set as follows. Namely, for each of the R, G and B input signals, assuming the point at the highest level and the point at the lowest level to be respectively the highlight and shadow points, the same output levels are obtained at the highlight and shadow points, respectively. With this provision, for the white portion, the R, G and B signals are produced with the same intensity and hence a white area is obtained.

However, for example, when shooting an object by means of an electronic still camera, an input video signal is generally subjected to processing to emphasize the contour. As a consequence, when a cumulative histogram is generated from the video signal of each pixel contained in the input video signal, the cumulative histogram includes influence from a pixel of which the level has been changed due to the contour emphasis, which interferes with correctly determining the highlight and shadow points.

Furthermore, since the input video signal is ordinarily mixed with a noise, the cumulative histogram is also under the influence of noise, which leads to a disadvantage also in this regard that the determination of the highlight and shadow points cannot be appropriately effected.

Incidentally, there has been a method of generating a lookup table to correct the gradation of the R, G and B signals in which the cumulative histogram is generated from the luminance signal Y of the input video signal to attain the highlight and shadow points from the histogram associated with the luminance signal Y so as to use these points as the highlight and shadow points of the R, G and B signals. In the use of this method, since the differences between the R, G and B signals contained in the input video signal are not considered, the difference of the color tone cannot be corrected between the input signal and the actual object.

Furthermore, there has been a method of generating a lookup table to correct the gradation of the R, G and B signals in which a cumulative histogram is generated for each of the R, G and B signals obtained from the input video signal to determine the highlight and shadow points by use of the generated histograms. According to this method, in a case, for example, where a portion having a considerably high level exists in the R signal, namely, where a bright portion is found in an image, the highlight point of the R signal is set to a higher value when compared with those of the G and B signals and hence the intensity of the output signal of the R signal is lowered; consequently, the complementary color with respect to the R signal, namely, cyan C is strengthened in the recorded picture to lose the color balance.

In other words, according to this method, although there is no problem in a case where a picture represented by the input video signal includes a pure white portion, if the picture does not have such a white portion and there exists a high-level input signal for a pure color with a high chroma saturation, the influence described above is caused to appear by the input signal and hence a picture for which the gradation corrected with the lookup table has an unsatisfactory color balance. That is, the correction of the gradation with the established lookup table results in an over-correction and the tone of the picture differs from that of the actual object.

SUMMARY OF THE INVENTION

It is therefore an object of the present invention to provide a method of and an apparatus for processing an image in which optimal lookup table data is obtained to achieve an effective gradation correction, thereby removing the disadvantage of the prior art technology.

According to the present invention, there is provided a method of processing an image in which an image processing is effected for an input video signal based on the lookup table data to produce an output therefrom.

In response to a reception of an input video signal, a highlight point and a shadow point are established for the input video signal.

Based on the highlight and shadow points thus established, standard lookup table data is converted into lookup table data associated with the input video signal.

Depending on the lookup table data associated with the input video signal, the input video signal is subjected to an image processing.

In addition, according to the present invention, there is provided an image processing apparatus in which image processing means achieves an image processing for an input video signal based on a lookup table data to obtain an output signal, means for setting a highlight point and a shadow point receives the input video signal to establish a highlight point and a shadow point, standard lookup table keeping means retains standard lookup table data, and lookup table converting means converts the standard lookup table data, based on the highlight and shadow points thus established, into lookup table data associated with the input video signal and delivers the resultant data to the image processing means.

BRIEF DESCRIPTION OF THE DRAWINGS

The objects and features of the present invention will become more apparent from the consideration of the following detailed description taken in conjunction with the accompanying drawings in which:

FIGS. 1A and 1B, when combined as shown in FIG. 1, are schematic block diagrams illustrating an embodiment of an image recording system using an image processing apparatus according to the present invention;

FIGS. 2A and 2B, when combined as shown in FIG. 2, are schematic block diagrams illustrating an alternative embodiment of an image recording system using an image processing apparatus according to the present invention;

FIGS. 3A and 3B, when combined as shown in FIG. 3, are schematic block diagrams illustrating another alternative embodiment of an image recording system using an image processing apparatus according to the present invention;

FIGS. 4A and 4B, when combined as shown in FIG. 4, are schematic block diagrams illustrating still another alternative embodiment of an image recording system using an image processing apparatus according to the present invention;

DESCRIPTION OF THE PREFERRED EMBODIMENTS

Referring now to the accompanying drawings, a description will be given of embodiments of a method of and an apparatus for processing an image according to the present invention.

Figure 1B:
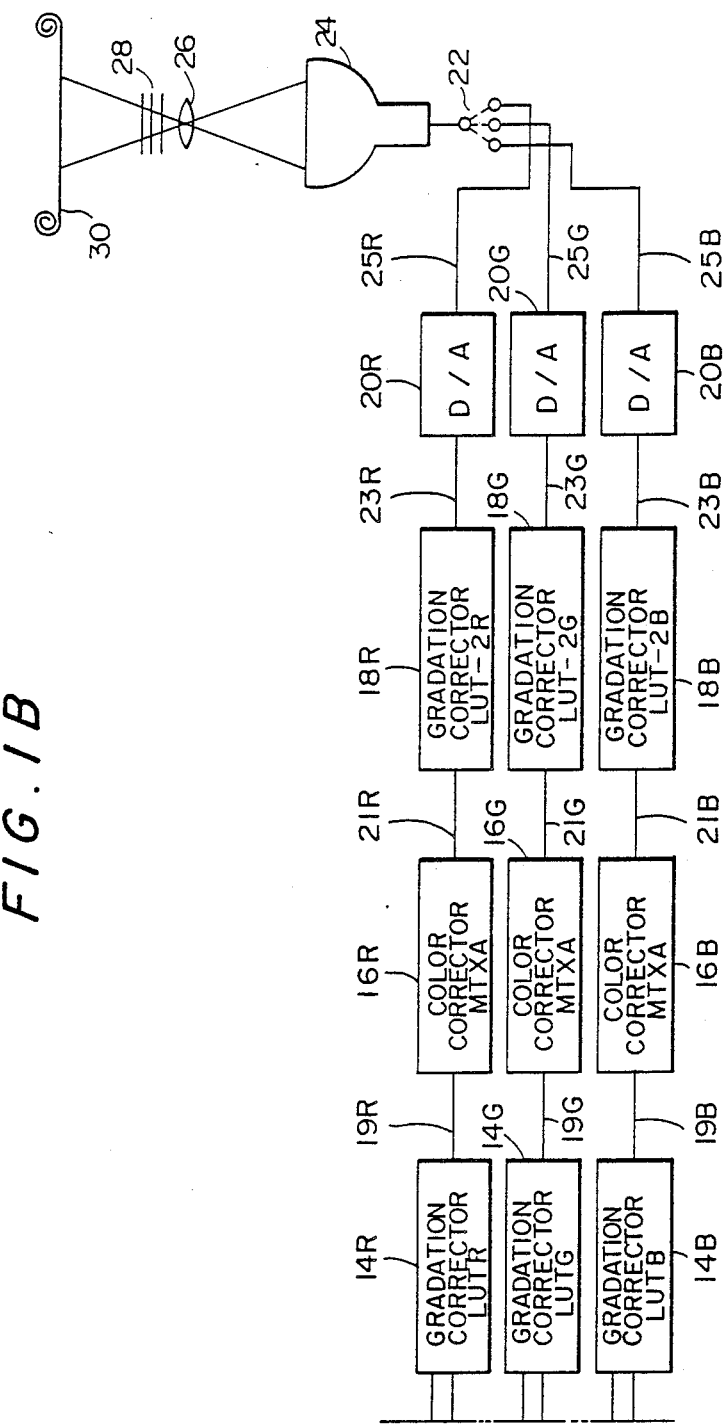

FIGS. 1A–1B show an embodiment of an image recording system using an image processing apparatus according to the present invention.

For example, from a video signal source of a video floppy disk playback system, video signals in the form of three-principle-color signals R, G and B are supplied to input terminals 11R, 11G and 11B of analog-to-digital, A/D converters 10R, 10G and 10B, respectively. The A/D converters 10R, 10G and 10B respectively convert the input video signals 11R, 11G and 11B in response to a synchronizing signal SYNC 13 to deliver output signals 15R, 15G and 15B to frame memories 12R, 12G and 12B, respectively.

The frame memories 12R, 12G and 12B are used to store signal data of the respective pixels constituting a frame of signal data of pixels constituting an image. From the frame memories 12R, 12G and 12B, output signals 17R, 17G and 17B are fed to gradation correctors 14R, 14G and 14B, respectively.

The lookup tables LUTR, LUTG and LUTB for the gradation correction are respectively established in the gradation correctors 14R, 14G and 14B, which are parameter correctors for effecting gradation correction. The lookup tables LUTR, LUTG and LUTB are respectively generated in lookup table convertors 34R, 34G and 34B and are respectively supplied to the gradation correctors 14R, 14G and 14B, which will be described later.

The lookup tables LUTR, LUTG and LUTB for the gradation correction are respectively constituted from data to be converted into signals which are supplied to a high-brightness CRT so as to cause the color components C, M and Y to develop colors in a sheet of color printing paper 30. Through conversions of signal levels by use of the lookup tables LUTR, LUTG and LUTB, a compensation is effected for the differences due to the illumination condition used when an image represented by the input video signal is formed.

Next, a description will be given of the lookup tables LUTR, LUTG and LUTB for the gradation correction.

Figure 5:
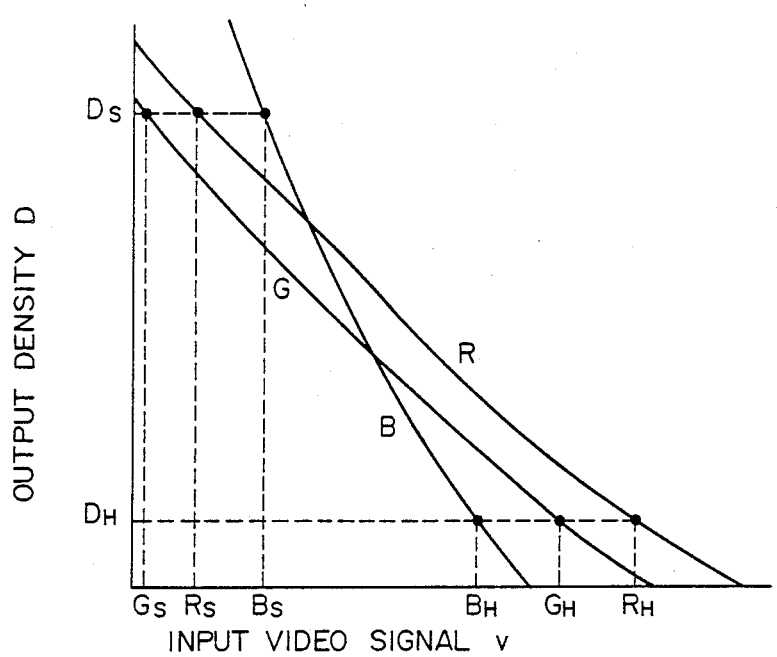
FIG. 5 is a graph showing an example of lookup tables LUTR, LUTG and LUTB stored in a gradation corrector of FIG. 1.

FIG. 5 shows data associated with examples of the lookup tables LUTR, LUTG and LUTB. In this graph, the abscissa and the ordinate respectively indicate a level of an input video signal v and a level of a density signal D to be produced. By use of such lookup tables LUTR, LUTG and LUTB respectively provided for the signals R, G and B, the input video signal v for each of R, G and B is converted into an output signal representing the density D.

In FIG. 5, points RH, GH and BH respectively nearest to the highest levels of the input video signals R, G and B represent the highlight points, whereas points RS, GS and BS respectively nearest to the lowest levels of the R, G and B signals indicate the shadow points. The output signals for the input video signals R, G and B associated with the highlight points RH, GH and BH have a density D which is fixed to a value DH. Similarly, the output signals for the input video signals R, G and B associated with the shadow points RS, GS and BS have a density D which is fixed to a value DS. In a case where such curves are established as those of FIG. 5 representing the data of the lookup tables LUTR, LUTG and LUTB, much account is taken of the highlight points RH, GH and BH and the shadow points RS, GS and BS.

For example, for the lookup table LUTR, a curve is drawn to pass two points including the highlight point (RH, DH) and the shadow point (RS, DS).

The highlight and shadow points are attained as follows.

Figure 6:
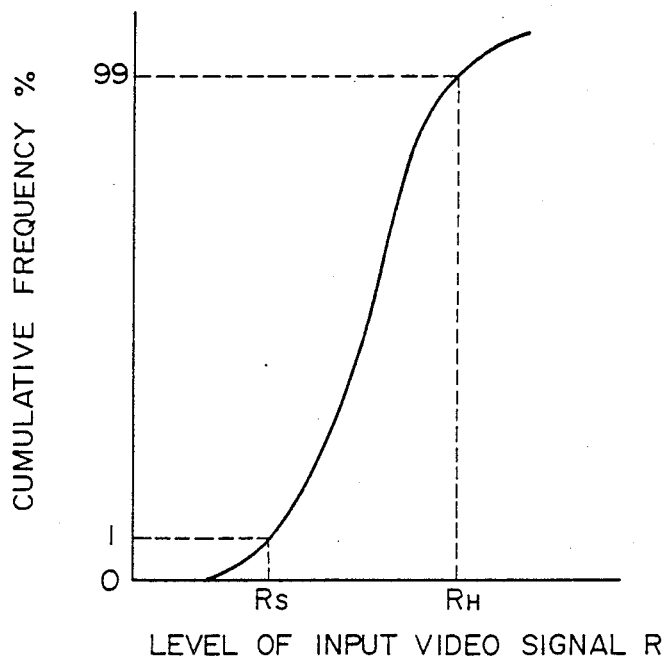
FIG. 6 is a graph illustrating an example of a cumulative histogram of an input video signal of FIG. 1.

For each of the input video signals R, G and B, a cumulative histogram is generated as shown in FIG. 6. The graph of FIG. 6 represents a frequency distribution of video signals of each pixel associated with a frame of an image. In this graph, the abscissa indicates a level of the input video signal, whereas the ordinate indicates, at a point on a histogram curve, a ratio (%) of the accumulated number of pixels having video signal levels below the pertinent input video signal level to the total number of pixels contained in a frame of an image.

Consequently, the highlight point RH in FIG. 6 represents that 99% of the video signals of the pixels have signal levels less than the level of RH. The highlight point described above is ordinarily set to a point for which 95%–99% is indicated in the cumulative histogram. Similarly, the shadow point RS in FIG. 6 indicates that 1% of the video signals of the pixels have signal levels less than the level of RS, and the shadow point is usually set to a point for which 1%–5% is indicated in the cumulative histogram.

For the highlight and shadow points thus established, the predetermined values DH and DS are set as the output density, respectively. Using these density values, a curve of the lookup table LUTR is plotted to pass two points of the highlight point (RH, DH) and the shadow point (RS, DS).

Returning now to FIG. 1, outputs 19 including 19R, 19G and 19B for which the gradation is corrected by the gradation corrector 14R, 14G and 14B, respectively are passed through color correctors 16R, 16G and 16B; gradation correctors 18R, 18G and 18B, and D/A converters 20R, 20G and 20B, respectively so as to be alternatively selected by means of a switch 22. The selected signal is delivered to the recording CRT 24 having a high brightness. A lens 26 and a 3-color decomposing filter 28 are arranged before a display screen of the recording CRT 24 so as to focus an image displayed on the screen onto a sheet of color printing paper 30.

The color correctors 16R, 16G and 16B each are loaded with color correction matrixes MTXS's to form parameter correcting sections for compensating for differences between the hue characteristic of photosensitive materials and that of the signal source of the input video signal. For example, in a case where a TV camera is used as the input signal source, the color correction matrix includes matrix coefficients to compensate for the difference between the hue characteristic of TV camera and that of the color printing paper 30. With this provision, outputs 21 include video signal data of which the hue has been corrected to obtain a target density.

The gradation correctors 18R, 18G and 18B respectively contain gradation correction lookup tables LUT-2R, LUT-2G and LUT-2B to configure parameter correcting sections for compensating for the gradation characteristics of the recording CRT 24 and the printing paper 30. Outputs 23 from the gradation correctors 18R, 18G and 18B are respectively supplied to the D/A converters 20R, 20G and 20B so as to be converted into analog signals associated therewith. These analog signals are fed via the switch 22 to the recording CRT 24. The switch 22 is a selecting circuit which receives 3-color decomposed signals R, G and B respectively outputted from the D/A converters 20R, 20G and 20B to alternatively select a signal to be delivered to the recording CRT 24.

The output signals 17R, 17G and 18B from the frame memories 12R, 12G and 12B are respectively fed to the cumulative histogram generators 32R, 32G and 32B. In the cumulative histogram generators 32R, 32G and 32B, signal data of all pixels constituting a frame of an image are arranged according to the levels of the signals. For each input video signal, a ratio of the accumulated number of signals having levels less than a level of the input video signal to the total number of input video signals is calculated so as to deliver levels respectively indicating the highlight point with 99–95% and the shadow point with 1–5% at outputs 27R, 27G and 27B to the LUT converters 34R, 34G and 34B, respectively. Incidentally, the signals 17R, 17G and 17B fed to the cumulative histogram generators 32R, 32G and 32B need not necessarily be the data of all pixels representing a frame of an image, namely, these signals may be constituted by sampled data.

Furthermore, the LUT converters 34R, 34G and 34B are supplied with an output from a standard lookup table storage 36, which stores a lookup table L0 to be used as a standard for gradation correction.

The LUT converters 34R, 34G and 34B convert an output 29 of the standard lookup table L0 read from the standard lookup table storage 36 in consideration of the outputs 27R, 27G and 27B of the highlight and shadow points delivered from the cumulative histogram generators 32R, 32G and 32B, respectively so as to produce lookup table data associated with the image. Outputs 31R, 31G and 31B from the LUT converters 34R, 34G and 34B are respectively delivered to the gradation correctors 14R, 14G and 14B, which effect gradation correction of the input video signals 17R, 17G and 17B by use of the lookup table data fed from the LUT converters 34R, 24G and 34B.

Next, a description will be given of an operation to generate the lookup table data in the LUT converters 34R, 34G and 34B.

Figure 7:
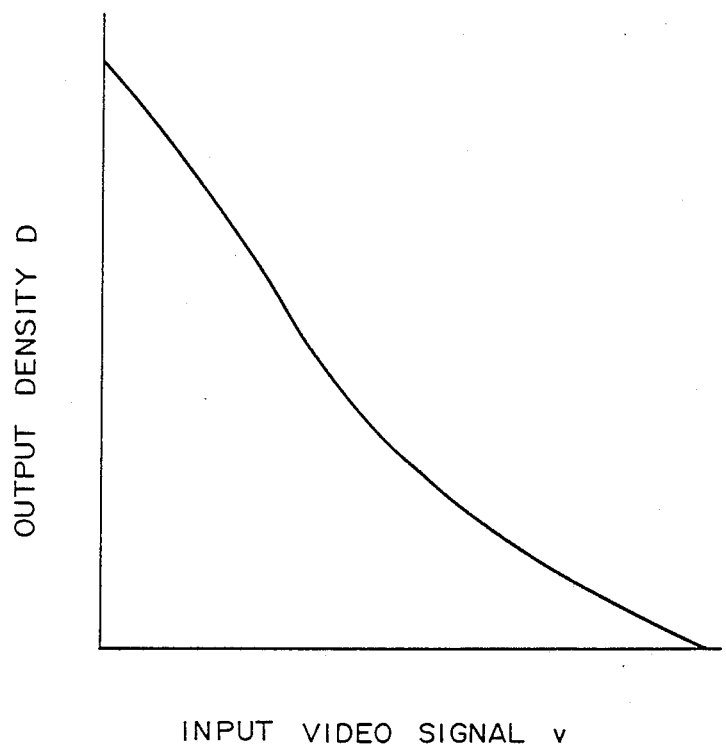
FIG. 7 is a graph depicting a standard lookup table L0 stored in a standard lookup table storage of FIG. 1.

The standard lookup table data L0 to be inputted from the standard lookup table storage 36 to the LUT converters 34R, 34G and 34B draws a curve as shown in FIG. 7. In this embodiment, this curve is expressed by $$D = -2.2 \log v$$

where, v is a level of the input video signal, D indicates an output density, and a coefficient value of 2.2 is a reciprocal of the Gamma value for the video system.

In the LUT converters 34R, 34G and 34B, the standard curve L0 is subjected to a functional transformation according to the following formula to establish the lookup tables LUTR, LUTG and LUTB.

$$L(v) = S[c \, L0\{a(v+b)\} + d] \tag{1}$$

In this expression, L0 the standard curve of a lookup table represented by $D = -2.2 \log v$, v denotes a level of the input video signal, a to d are transformation parameters, $S[\ ]$ indicates a transformation coefficient used to achieve a nonlinear transformation, and L(v) is the output density.

All of the transformation parameters a to d need not be necessarily used, namely, a combination of only a and b or c and d may be used. In addition, the functional transformation with the function $S[\ ]$ may be omitted. In a case where only the parameters a and b are adopted, $c=1$ and $d=0$ are assumed to obtain the expression as $$L(v) = L0\{a(v+b)\} \tag{2}$$

Furthermore, when only the parameter d is used, $a=1$ and $b=0$ are assumed to reduce the expression to $$L(v) = c \, L0(v) + d \tag{3}$$

A description will be given of a case where, for example, using the expression (2) including the transformation parameters a and b, the standard curve L0 is transformed through the function to generate the lookup table LUTR to be used to correct the gradation of the input video signal R selected from the 3-principle-color signals constituting the input video signal.

The following expressions are attained through substitution of the values of the highlight points (RH, DH) and the shadow point (RS, DS) included in the output 27R from the cumulative histogram generator 32R into the expression (2).

$$DH = L0\{a(RH+b)\} \tag{21}$$

$$DS = L0\{a(RS+b)\} \tag{22}$$

Substituting a and b obtained from the simultaneous system of linear equations into the expression (2), the curve of the lookup table LUTR is attained. As can be seen from the expression (2), the transformation parameters a and b respectively indicate a dynamic range and a position of a black level at a rising edge of the histogram.

Subsequent to the creation of the curve of the lookup table LUTR, the curves of the lookup tables LUTG and LUTB are generated in a similar fashion. The outputs 31R, 31G and 31B representing the lookup tables LUTR, LUTG and LUTB established in the LUT converters 34R, 34G and 34B are delivered to the gradation correctors 14R, 14G and 14B, respectively.

The gradation correctors 14R, 14G and 14B effect the gradation correction on the input video signals 17R, 17G and 17B by use of the lookup tables LUTR, LUTG and LUTB to produce the output signals 19R, 19G and 19B, respectively, which are then respectively passed through the color correctors 16R, 16G and 16B, the gradation correctors 18R, 18G and 18B, and the D/A converters 20R, 20G and 20B so as to be alternatively selected by the switch 22. The selected signal is then fed to the recording CRT 24, which generates a color image on a sheet of printing paper 30.

According to this embodiment, since the curves of the lookup tables used for the gradation correction of the input video signals 17R, 17G and 17B in the gradation correctors 14R, 14G and 14B are established to pass the highlight and shadow points of the cumulative histogram, the curves of the lookup tables are correct at these points.

Moreover, since a functional transformation is achieved for the standard lookup table curve L0 to obtain the lookup tables without referencing a middle portion of the cumulative histogram, there is attained correct gradation correction data which does not depend on the scene even in the middle section between the highlight and the shadow, which prevents the recorded image from becoming unnatural.

In addition, the standard LUT storage 36 need only be loaded with the standard lookup table curve L0, namely, the many lookup table curves required in the conventional system are not required to be stored, and thus the capacity of the storage can be minimized.

Figure 2B:
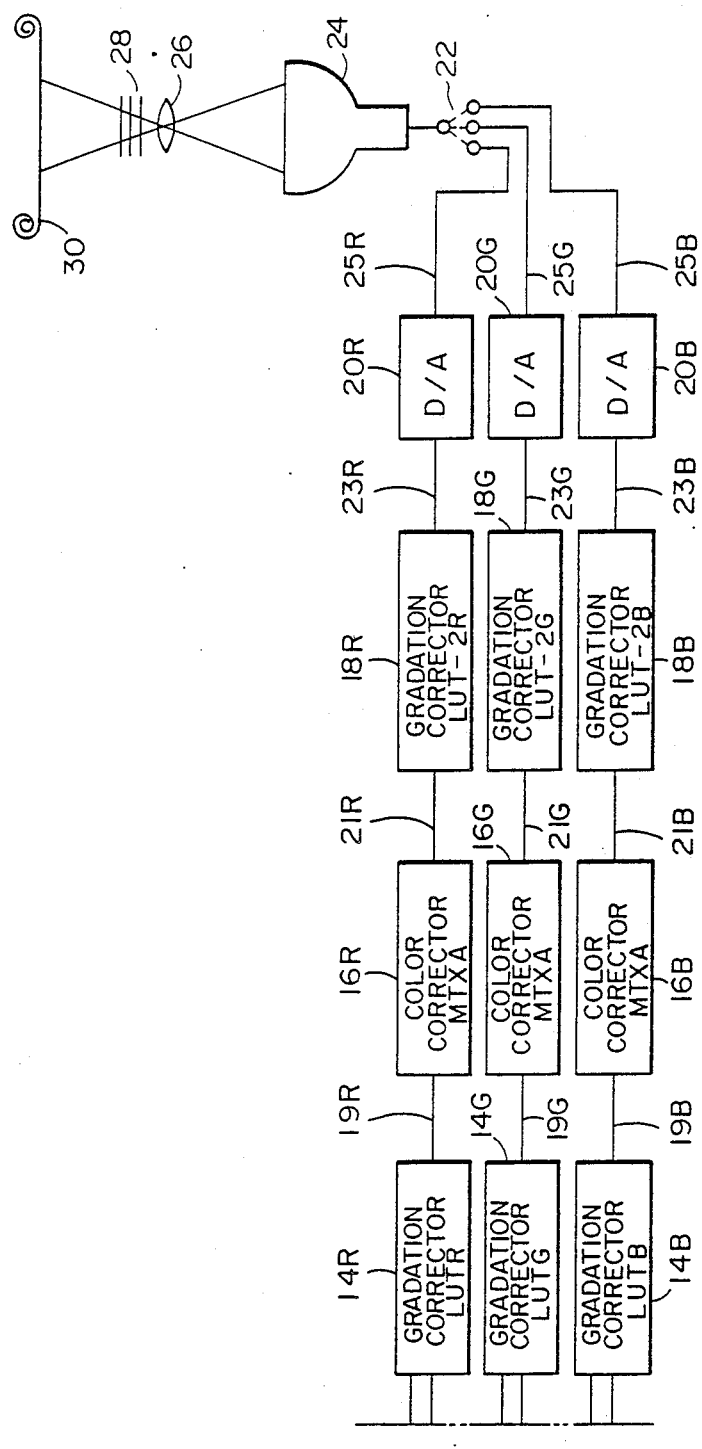

FIGS. 2A-2B show an alternative embodiment of the image recording system using an image processing apparatus according to the present invention.

In this embodiment, outputs 27R, 27G and 27B from cumulative histogram generators 32R, 32G and 32B are delivered to highlight/shadow point calculators 38R, 38G and 38B, respectively.

The highlight/shadow point calculators 38R, 38G and 38B respectively calculate the highlight and shadow points by use of the outputs 27R, 27G and 27B from the cumulative histogram generators 32R, 32G and 32B, which will be described later, so as to supply outputs 33R, 33G and 33B therefrom to LUT converters 34R, 34G and 34B, respectively.

The LUT converters 34R, 34G and 34B convert outputs 29 of a standard lookup table L0 read from a standard lookup table storage 36 in consideration of the outputs 33R, 33G and 33B of the highlight and shadow points supplied from the highlight/shadow point calculators 38R, 38G and 38B to generate lookup table data for the image.

Next, a description will be given of an operation to generate the cumulative histograms in the cumulative histogram generators 32R, 32G and 32B and an operation to calculate the highlight and shadow points in the highlight/shadow point generators 38R, 38G and 38B.

Figure 8:
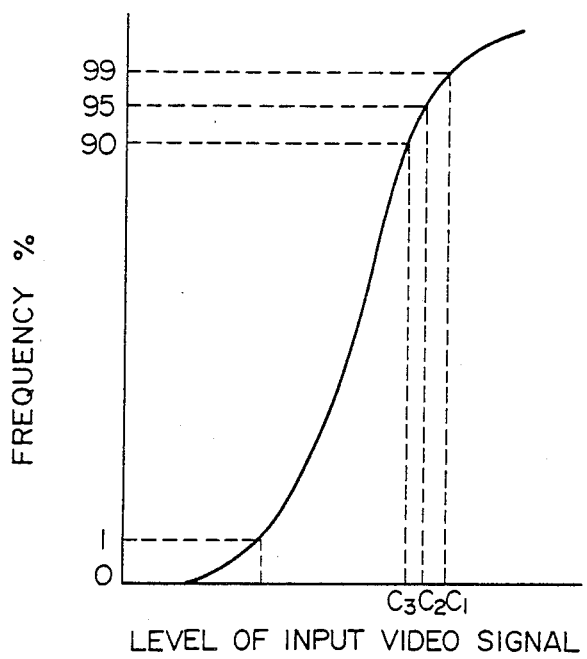
FIG. 8 is a graph showing an example of a cumulative histogram of an input video signal of FIG. 1.

In the cumulative histogram generators 32R, 32G and 32B, the cumulative histograms are generated for the respective input video signals R, G and B as shown in FIG. 8.

Pixels used to create the cumulative histograms need not include all pixels representing a frame of an image, namely, sampled pixels may be used.

In FIG. 8, the levels of the input video signals associated with the points having frequency values 99%, 95% and 90% are represented as C1, C2 and C3, respectively.

The highlight/shadow calculators 38R, 38G and 38B receive as inputs C1, C2 and C3 values produced from the cumulative histogram generators 32R, 32G and 32B, respectively so as to calculate a highlight point CH according to the following expression.

$$CH = t\,C2 + (1-t)C1 \quad (1)$$

where, $$t = (C2-C3)/(C1-C3) \quad (2)$$

That is, a ratio t of a level difference between points C2 and C3 to the level difference between points C1 and C3 is attained according to the expression (2) to substitute the resultant value for t in the expression (1), thereby obtaining the highlight point CH. As can be seen from the expression (1), the highlight point CH is set to an intermediate point between the point C1 with a frequency of 99% and the point C2 with a frequency of 95%.

Figure 9:
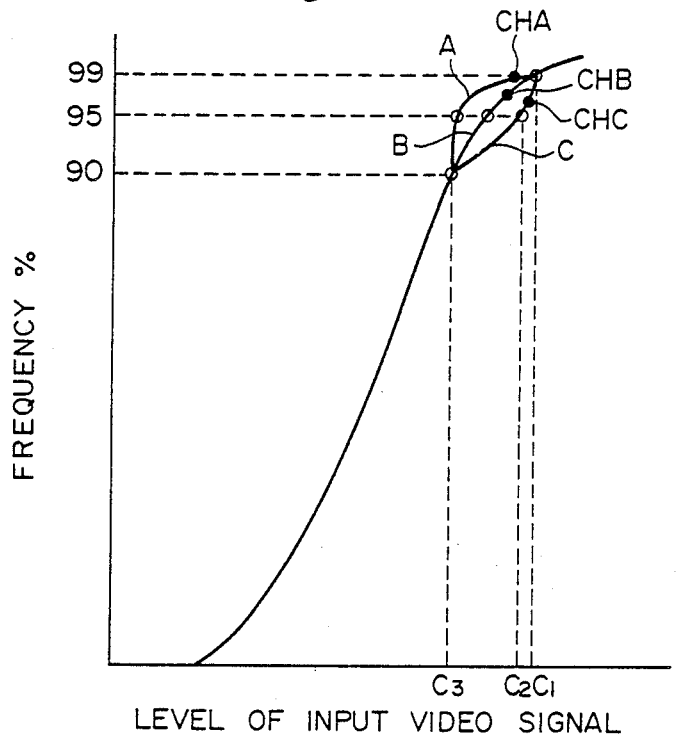
FIG. 9 is a graph useful for comparing different levels of an input signal in the neighborhood of a highlight point in the cumulative histogram.

FIG. 9 shows three kinds of cumulative histograms. In the graph of FIG. 9, the histogram A has a great gradient between the points C3 and the C2 and gradient is small between the points C2 and C1. In the histogram A, since ratio t of the level difference between the points C2 and C3 to the level difference between the points C1 and C3 is small, the highlight point CHA calculated from the expression (1) is located at a point near the point C1 as shown in FIG. 9.

Contrary to the histogram A, since the histogram C has a large ratio value t of the level difference between the points C2 and C3 to that between the points C1 and C3, the highlight point CHC calculated from the expression (1) is set to a position near the point C2 as shown in FIG. 9.

Furthermore, the histogram B is located between the histograms A and C and hence the value of t takes an intermediate value; consequently, the highlight point CHB calculated from the expression (1) is positioned at a substantially middle point between the points C1 and C2 as shown in FIG. 9.

Incidentally, substitution of the expression (2) into the expression (1) results in, $$CH = C2(C2-C3)/(C1-C3) + C1(C1-C2)/(C1-C3)$$

As can be seen from the curves of the lookup tables of FIG. 5, at an input video signal level above the levels in the proximity of the highlight point or exceeding the level of the highlight point, the ratio of the output density difference to the input video signal difference is small. That is, the contrast of the output density is small; consequently, to increase the contrast of the output density, the highlight point must be set to a point having a high level in the input video signal.

In FIG. 9, for the histogram B, the highlight point is set to an intermediate point between the points C1 and C2. In a general image, the histogram has a shape like that of the histogram B in many cases. In a case where the highlight portion has a great area, since the points C2 and C3 locate in the vicinity of point C1 the highlight point CHB also approaches the point C1 and hence much account is taken of the contrast of the highlight section. On the other hand, when the highlight portion has a small area, since the points C2 and C3 move apart from the point C1, the highlight point CHB is also distant from the point C1 and little account is taken of the contrast of the highlight portion. As a result, the overall image is displayed in a hard tone with a satisfactory gradation.

For the histogram A, since there exists a small level difference of the input video signals between the frequency of 90% and the frequency of 95%, the portion for which the input video signal is at the pertinent level has a large area. As described above, the highlight point CHA of the histogram A is set to a position near the point C1. Consequently, the contrast of the output density can be increased for a large-area portion in the neighborhood of the highlight portion between the frequency of 90% and the frequency of 95%.

In a case of the histogram C, since there exists a great level difference of the input video signals between the frequency of 90% and the frequency of 95%, the portion for which the input video signal is at the pertinent level has a small area. As described above, the highlight point CHC of the histogram C is located at a position near the point C2; consequently, the contrast of the output density is reduced for the portion between the frequency of 90% and the frequency of 95%. However, since this portion has a small area and hence attracts less attention of the observer, the decreased contrast does not cause any problem.

For the histogram C, the level difference of the input video signals is large between the frequency of 90% and the frequency of 95%, and hence the portion of the pertinent level has a large area and the highlight point CHC is established in the vicinity of the point C2. As a result, the contrast also becomes reduced in this large-area portion; however, since there exists little level difference of the input video signals in the portion, no problem arises even when the highlight point CHC is location at any position between the points C1 and C2.

In the histograms A and B of FIG. 9, although the curves have the different gradients between the points C3 and C2 and between the points C2 and C1, the ordinary curve has a gradient substantially the same as gradient like the histogram B, and hence $t=\frac{1}{2}$ results from the expression (2). Consequently, the expression (1) to attain the highlight point is reduced to $$CH=\tfrac{1}{2}(C2+C1) \tag{3}$$

As a result, in a case where the gradient of the curve of a histogram does not have such an abrupt change as that shown at the point C2 of the histograms A and B of FIG. 9, the highlight point CH may be calculated from the expression (3).

The description above has been made of the operation with reference to an example of a highlight point. Similarly, for a shadow point, the calculation of an appropriate point need only be effected by use of the levels of input video signals with the frequencies of 1%, 5% and 10%. For a case of a shadow point, according to the lookup table of FIG. 5, although the level difference of the input signals in the neighborhood of the shadow point is emphasized in the output density, the large level difference of the output density is minimized through a subsequent process and hence a correction to increase the gradation is also necessary when a large area exists in the proximity of the shadow point.

Assuming the output density D associated with each of the highlight and shadow points thus established to be the predetermined values DH and DS, a curve of the lookup table LUTR passing the two points, for example, the highlight point (RH, DH) and the shadow point (RS, DS) is drawn based on the values DH and DS as described above.

According to the embodiment, for example, the highlight point is calculated from the expression (1) so as to be established at a point between the frequency of 99% and the frequency of 95% in the cumulative histogram. In the operation to set the highlight point, referencing the input video signal levels of the frequencies 99%, 95% and 90% in the cumulative histogram, the highlight region, namely, the size of an area of the portion for which the input video signals have levels between 99% and 95% in the histogram and an area in the proximity of the highlight point according to the value of t, namely, the size of an area of the portion for which the input video signals have levels between 95% and 90% in the histogram is judged.

In a general image, when a region including the highlight region and the region near the highlight point, namely, the region in the range from 99% to 90% has a large area, the highlight point is set to a point associated with an input video signal level in the neighborhood of 99% and much account can be made of the gradation in the highlight region. Contrarily, if this portion has a small area, the highlight point is established at a point with a large distance from the point of 99% and a reduced gradation can be set to the highlight region to obtain a hard tone in the overall image.

Furthermore, in a case where the region near the highlight, namely, the region in the range from 95% to 90% has a large area, since the value t is decreased, the highlight point CH is obtained from the expression (1) to be set to a position in the proximity of the point associated with the frequency of 99% in the cumulative histogram. Consequently, the region near the highlight, namely, the portion of the input video signals having levels between 95% and 90% in the cumulative histogram occupies a great area. If it is desired to emphasize the gradation in this portion, the highlight point may be set to a high value to attain the desired gradation.

On the contrary, when the portion of the input video signals having levels between 95% and 90% has a small area in the cumulative histogram, since the value of t is increased, the highlight point is calculated from the expression (1) to be established at a location near the point of 95% in the cumulative histogram. Consequently, in a case where the portion of input video signals with levels near the level of the highlight point possesses a small area and it is desired to obtain a hard tone without emphasizing the gradation in this portion, the highlight point may be lowered to suppress the gradation.

As a result, for example, a desired gradation can be set in the portion of input video signals with levels in the neighborhood of the level of the highlight point according to the area of the portion.

For example, if the point of 99% in the cumulative histogram is fixedly set as the highlight point, regardless of the area of the portion with the levels near the highlight point, the portion has a fixed gradation. Consequently, even when the area is large and the gradation is desired to be changed to large, the gradation cannot be obtained with the desired magnitude; whereas when the area is small and a hard gradation is desired without emphasizing the gradation, a relatively strong gradation is attained.

According to the embodiment, as described above, since the position at which the highlight point is established varies depending on the area of the portion with levels near the level of the highlight point, an appropriate gradation can be set according to the image.

Moreover, in a case, for example, in which the highlight point is established only by use of the point associated with the frequency of 99% in the cumulative histogram, when the number of sampling points is decreased, if input video signals having levels of the points include noise or represent an emphasized contour, a contour the highlight point may be established at a wrong position.

According to the present embodiment, since three points of 99%, 95% and 90% are considered when the highlight point is determined, the possibility of an influence from noise is reduced and hence an appropriate highlight point can be set with a desired gradation depending on the image.

Figure 3B:
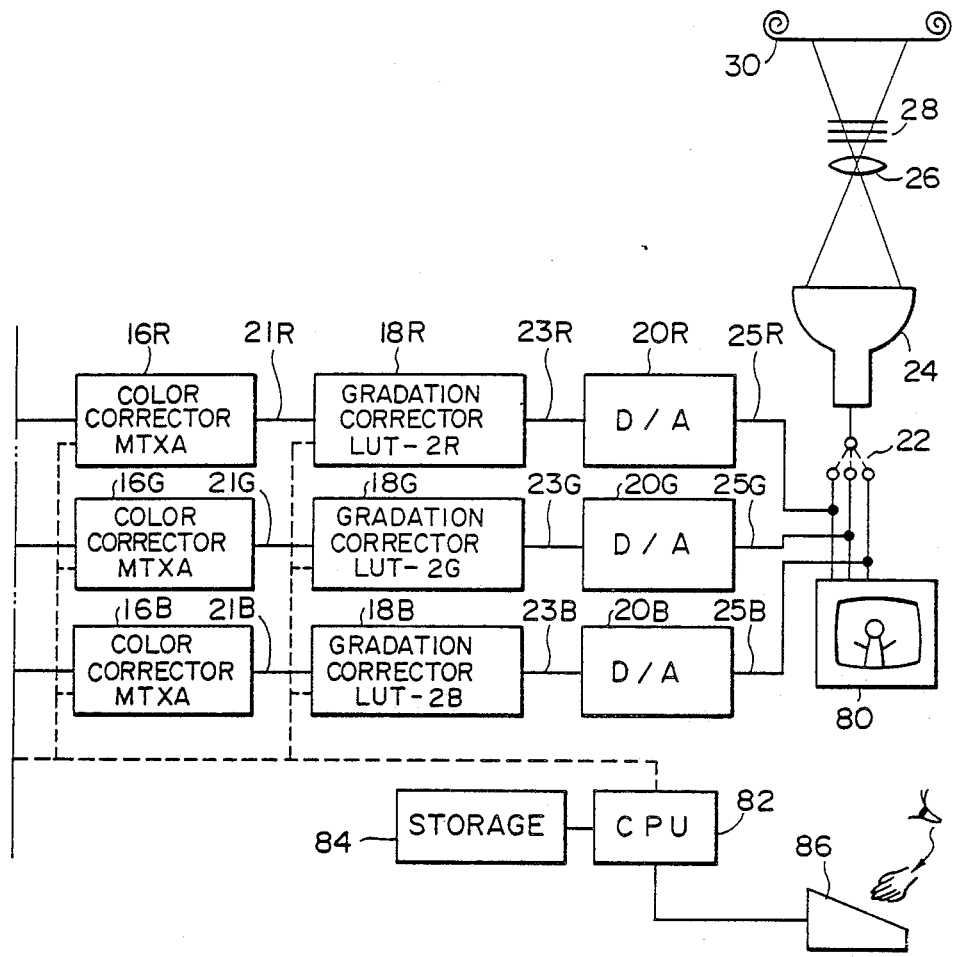

FIGS. 3A-3B show a further alternative embodiment of an image recording system using an image processing apparatus according to the present invention.

In this embodiment, A/D converters 10R, 10G and 10B deliver outputs 15R, 15G and 15B to sharpness circuits 40R, 40G and 40B, respectively.

The sharpness circuits 40R, 40G and 40B respectively receive video signals from the A/D converters 10R, 10G and 10B to obtain a desired sharpness or softness for the video signals. The sharpness circuits 40R, 40G and 40B are respectively loaded with sharpness emphasizing coefficients to form matrix circuits setting the sharpness for the input digital video signals 15R, 15G and 15B, respectively.

For example, when the sharpness emphasizing coefficients are set to emphasize the sharpness of the input signals, the contour emphasis is effected for the input video signals 15R, 15G and 15B. That is, for contour portions of which signal levels vary, the signal levels are processed to abruptly change, thereby emphasizing the contour.

When the sharpness emphasizing coefficients are set to soften the sharpness of the input video signals 15R, 15G and 15B, these signals of which the contour portions have been emphasized are restored to the original input video signals 15R, 15G and 15B before the contour emphasis. That is, the input video signals 15R, 15G and 15B are processed so that the signal levels of the contour portions thus emphasized change more slowly; consequently, the emphasis of the contour is removed.

The sharpness circuits 40R, 40G and 40B supply outputs 39R, 39G and 39B to frame memories 12R, 12G and 12B, respectively.

The D/A converters 20R, 20G and 20B deliver outputs 25R, 25G and 25B to a switch 22 on one side and to a video monitor 80 on the other side.

The outputs 25R, 25G and 25B received by the switch 22 are alternatively selected so as to be fed to a recording monochrome CRT 24 with a high brightness.

The switch 22 is a selecting circuit which alternatively selects one of the 3 decomposed color signals 25R, 25G and 25B respectively from the D/A converters 20R, 20G and 20B to supply the selected signal to the recording CRT 24.

Moreover, the analog signal outputs 25R, 25G and 25B respectively from the D/A converters 20R, 20G and 20B are supplied to the video monitor 80, which displays an image after a gradation correction. Checking the displayed image, the operator achieves necessary operations, which will be described later.

A controller 82 is a control unit to control the operation of the overall system and comprises, for example, a processing system such as a microprocessor. The controller 82 is connected to the sharpness circuits 40R, 40G and 40B; color correctors 16R, 16G and 16B; gradation correctors 18R, 18G and 18B; and a storage 84 storing values of the sharpness emphasizing coefficients to be used in the sharpness processing and various parameter values to be set as a color correction matrix MTXA and lookup tables LUT-2R, LUT-2G and LUT-2B.

The controller 82 is further connected to an input unit 86 such as a keyboard to be used by the operator, for example, to select or to modify the values of the sharpness emphasizing coefficients and the image processing parameters such as the lookup table LUT-2R and to supply a necessary instruction such as an instruction to record an image.

In the embodiment, when generating a cumulative histogram, the operator sets from the input unit 86 the sharpness emphasizing coefficients in the sharpness circuits 40R, 40G and 40B to the values which soften the sharpness of the input video signals 15R, 15G and 15B. In a case where the A/D converters 10R, 10G, 10B supply the sharpness circuits 40R, 40G and 40B with input signals having a contour emphasized, the contour emphasis is removed from the video signals in the sharpness circuits 40R, 40G and 40B to restore the input signals to the original signals without the contour emphasis. Furthermore, in the sharpness circuits 40R, 40G and 40B, the portion of which the level of the input video signals abruptly change is processed to develop a smooth change, namely, a portion having a high frequency is removed and hence the input video signals 15R, 15G and 15B become free from noise.

Consequently, since cumulative histogram generators 32R, 32G and 32B generate a cumulative histogram from the original signals free from contour emphasis and noise, appropriate highlight and shadow points are attained from the histogram. Lookup table converters 34R, 34G and 34B generate, based on the highlight and shadow points this determined, the lookup tables LUTR, LUTG and LUTB, which therefore effect a correct gradation correction of the input video signals.

After the lookup tables LUTR, LUTG and LUTB are established as described above, the operator changes the sharpness emphasizing coefficients of the sharpness circuits 40R, 40G and 40B such that the sharpness circuits 40R, 40G and 40B output the input video signals 15R, 15G and 15B without softening the sharpness of these signals. As a result, the input video signals 15R, 15G and 15B including the contour emphasis delivered from the A/D converters 10R, 10G and 10B are not changed by the sharpness circuits 40R, 40G and 40B so as to be directly supplied to the frame memories 12R, 12G and 12B, respectively. If the sharpness is desired to be further emphasized, the operator need only set the sharpness emphasizing coefficients of the sharpness circuits 40R, 40G and 40B to strengthen the contour of the input video signals.

For the input video signals 17R, 17G and 17B including the contour emphasis respectively fed from the frame memories 12R, 12G and 12B, the gradation correctors 14R, 14G and 14B can achieve an appropriate gradation correction by use of the lookup tables established as described above.

In the conventional system, such a removal of the contour emphasis from the input video signals 15R, 15G and 15B having undergone the contour emphasis is not achieved by the sharpness circuits 40R, 40G and 40B, the signals with the contour emphasized are respectively supplied to the cumulative histogram generators 32R, 32G and 32B to create the cumulative histograms. Moreover, signals including the noise directly are fed to the cumulative histogram generators 32R, 32G and 32B.

As a consequence, the highlight point or the shadow point determined from the cumulative histogram is incorrect due to the influence from the contour emphasis and noise and hence with the lookup tables LUTR, LUTG and LUTB generated from the highlight or shadow point, an appropriate gradation correction can not be effected.

According to the embodiment, as described above, since the influence of the contour emphasis and the noise are removed when the cumulative histograms are generated, the correct highlight and shadow points can be determined, which enables to appropriately achieve the gradation correction.

Furthermore, since the sharpness circuits 40R, 40G and 40B for the contour emphasis are also used to remove the influence of the contour emphasis from the input video signals including the contour emphasis, it is not necessary to dispose means for removing the contour emphasis and hence the efficiency of the system is improved.

Incidentally, in a case where the contour emphasis is to be suppressed by means of the sharpness circuits 40R, 40G and 40B, signals of a small-area portion in the image are removed; however, since the small-area portion has little influence on the sense of sight of a human, it is negligible.

In the embodiment above, although the sharpness emphasizing coefficients are set in the sharpness circuits 40R, 40G and 40B to remove the influence of the contour emphasis and noise from the input video signals, a low-pass filter may be adopted in place of the sharpness circuits 40R, 40G and 40B. In this case, the input video signals are passed through the low-pass filter, which then removes a high-frequency component to suppress the contour emphasis and the noise.

The input video signals from which the contour emphasis and noise have been removed are delivered to the cumulative histogram generators 32R, 32G and 32B to generate cumulative histograms. The input video signals 17R, 17G and 17B with the emphasized contour are supplied to the gradation correctors 14R, 14G and 14B, which achieve the gradation correction on the input signals to obtain a hard copy.

Furthermore, in a case where the input video signals include luminance signals and color difference signals, after the processing to remove the contour emphasis is executed on only the luminance signals in the sharpness circuits 40R, 40G and 40B or by use of a low-pass filter, the color signals R, G and B may be generated from the luminance signals and the color difference signals to obtain the respective cumulative histograms. The operation above suppresses the noise which may be contained in the luminance signals and hence the noise of the video signals to be fed to the cumulative histogram generators 32R, 32G and 32B can be reduced, which enables to correctly generating the cumulative histograms.

Figure 4B:
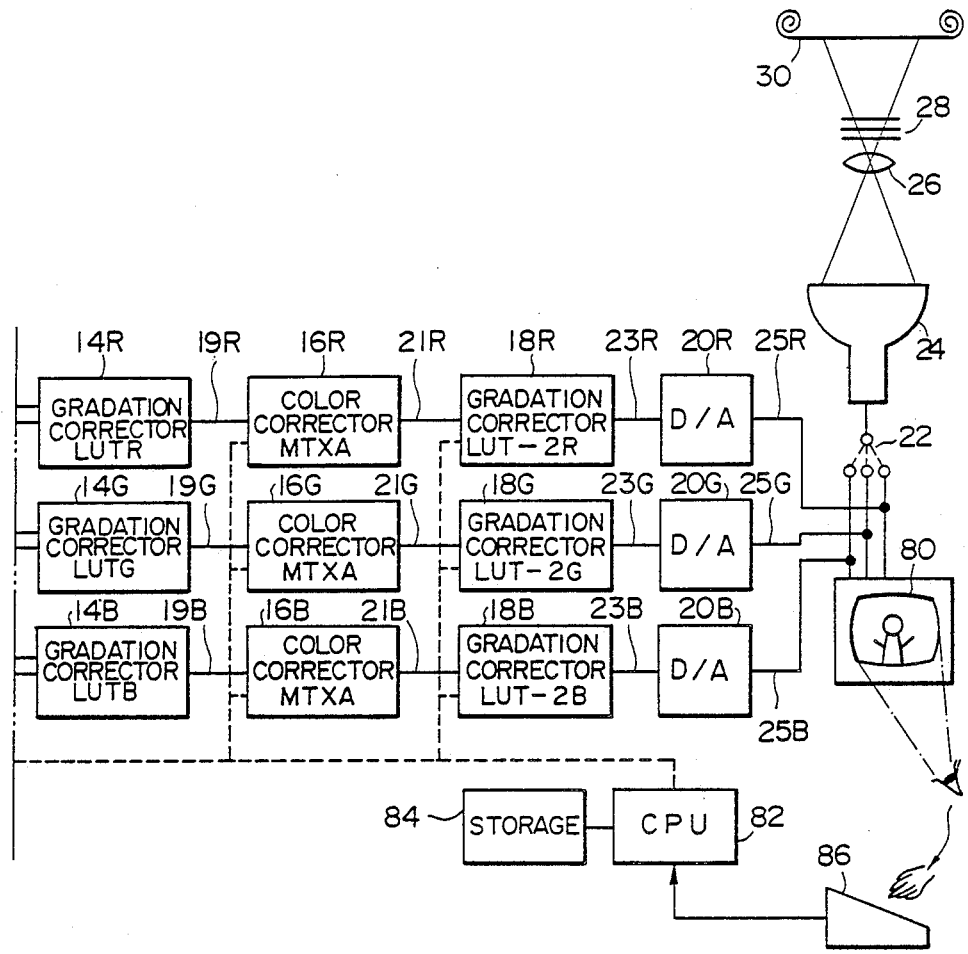

FIGS. 4A–4B show a still further alternative embodiment of an image recording system using an image processing apparatus according to the present invention.

In this embodiment, frame memories 12R, 12G and 12B respectively deliver output signals 17R, 17G and 17B to a luminance signal generator 42 and a correction adjuster 44.

The luminance signal generator 42 generates from the output signals 17R, 17G and 17B respectively from the frame memories 12R, 12G and 12B a luminance signal Y according to an expression $Y=0.3R+0.59G+0.11B$ so as to send an output 41 to the correction adjuster 44, which includes a decoder matrix to adjust the degree of color correction on the output signals 17R, 17G and 17B respectively from the frame memories 12R, 12G and 12B by use of the luminance signal from the luminance signal generator 42. The decoder matrix is used to generate an adjusting chroma signal C' expressed by $$C'=kC+(1-k)Y \quad (1)$$

from the chroma signals C respectively fed from the frame memories 12R, 12G and 12B. In the expression (1), k is a coefficient to adjust the degree of correction and takes a value in a range of $0 \leq k \leq 1$.

When the value of k is set to 1, a high correction results, namely, the color signals from the frame memories 12R, 12G and 12B are directly delivered as outputs 43R, 43G and 43B from the correction adjuster 44.

For K=0, the low correction results which replace the color signals from the frame memories 12R, 12G and 12B with the luminance signal Y from the luminance signal generator 42 in the correction adjuster 44, which thereby produces the outputs 43R, 43G and 43B.

The correction adjuster 44 delivers the outputs 43R, 43G and 43B to the cumulative histogram generators 32R, 32G and 32B, respectively. In this example, a controller 82 is connected to the correction adjuster 44, the color correctors 16R, 16G and 16B, the gradation correctors 18R, 18G and 18B, and a storage 84 storing the value k of the decoder matrix used to adjust the correction in the correction adjuster 44 and various parameter values set as the color correction matrix MTXA and the lookup tables LUT-2R, LUT-2G and LUT-2B.

The controller 82 is connected to an input unit 86 such as a keyboard to be used by the operator, for example, to select or to modify the value k of the decode matrix and image processing parameters such as the lookup table LUT-2R and to input a necessary instruction such as an instruction to record an image.

When the operator specifies 1 from the input unit 86 as the value of k of the decoder matrix to be stored in the correction adjuster 44, the high correction mode is set as described above and hence the respective color signals of the frame memories 12R, 12G and 12B are directly supplied as the outputs 43R, 43G and 43B from the correction adjuster 44. Consequently, the cumulative histogram generators 32R, 32G and 32B generates cumulative histograms by use of the color signals from the frame memories 12R, 12G and 12B. Based on the highlight and shadow points then attained from the cumulative histograms, the lookup table converters 34R, 34G and 34B respectively generate the lookup tables LUTR, LUTG and LUTB, which are in turn passed to gradation correctors 14R, 14G and 14B, respectively.

As a consequence, the gradation correctors 14R, 14G and 14B can appropriately correct the gradation of the respective color signals; however, for example, when an image includes a bright portion with a pure color having a high chroma saturation, an overcorrection results to lose the color balance, which leads to a color tone different from that of the actual object.

When the operator inputs 0 from the input unit 86 as the value of k of the decode matrix of the correction adjuster 44, the low correction mode is set as described above to replace the color signals respectively from the frame memories 12R, 12G and 12B with the luminance signal Y in the correction adjuster 44 so as to be delivered to the cumulative histogram generators 32R, 32G and 32B, respectively. Consequently, the cumulative histogram generators 32R, 32G and 32B generate cumulative histograms by use of the luminance signal Y from the luminance signal generator 42 to determine the highlight and shadow points. Based on the highlight and shadow points, the lookup table converters 34R, 34G and 34B respectively generate the lookup tables LUTR, LUTG and LUTB to be delivered to the gradation correctors 14R, 14G and 14B, respectively.

As a result, the gradation correctors 14R, 14G and 14B effect the same correction on the gradation of the respective color signals to correct only the brightness such that the resultant signals are produced without correcting the color balance.

When the value of k is set to a proper value between 0 and 1, the disadvantage above can be solved. That is, in the gradation correctors 14R, 14G and 14B, the correction of the gradation and the color balance can be effected on the respective color signals; furthermore, overcorrection is not caused in this case.

Since the value of k is desirably set to about 0.4 in ordinary cases, when the operator does not adjust the value of k by checking an image on a video monitor 80, the value of k need only be approximately set to 0.4.

On the other hand, the value of k can be adjusted as follows.

Confirming the image on the video monitor 80, the operator judges whether or not the displayed image includes a completely white portion. If this is the case, the value of k is set from the input unit 86 to 1 or a value in the proximity of 1. If the completely white portion is included, the operator specifies 1 for k to directly output the color signals of the frame memories 12R, 12G and 12B from the correction adjuster 44 so as to generate cumulative histograms. Based on the highlight and shadow points determined from the cumulative histograms, the lookup tables are generated to enable the gradation correctors 14R, 14G and 14B to appropriately correct the gradation of the respective color signals.

In a case where the image does not have a completely white portion and there is included a gray portion similar to white, for example, represented by R=G=B=0.9; moreover, the image contains a red portion with a high chroma saturation represented by R=1.0 and G=B=0, if k is set to a value near 1, overcorrection takes place as described above to create an image with a weak red and a strong cyan. In this case, therefore, the value of k is set to a small value to prevent the overcorrection. Incidentally, when k is specified with a small value, since the highlight point is attained from a signal in the vicinity of the luminance signal Y so as to be set to a lower point, it is desirable to set high values to the output density values D to be produced from the gradation correctors 14R, 14G and 14B for the highlight points.

Moreover, the value of k may be beforehand set to 1 or a value near 1 so that only when the operator judges that a completely white portion is missing in the image displayed on the video monitor 80, the value of k is changed to a smaller value.

As described above, in a case where an image includes a slightly gray portion near white represented by R=G=B=0.9 and a red portion with a high chroma saturation represented by R=1.0 and G=B=0, if k is set, for example, to 0.4, the correction adjuster 44 produces the output signals as follows.

For the luminance signal Y of the portion of R=G=B=0.9.

R=G=B=0.9 is substituted in $Y=0.3R+0.59G+0.11B$ to attain Y=0.9. Consequently, the correction adjuster 44 produces an adjusted chroma signal $$C'=kC+(1-k)Y$$

which has an R component R' as follows.

$$R'=0.4\times0.9+(1-0.4)\times0.9=0.9$$

On the other hand, the luminance signal Y of the portion associated with G=B=0 is calculated by substituting R=1.0 and G=B=0 in the expression $Y=0.3R+0.59G+0.11B$ to attain Y=0.3. Consequently, the correction adjuster 44 produces an adjusted chroma signal $$C'=kC+(1-k)Y$$

which has an R component R' as follows.

$$R'=0.4\times1+(1-0.4)\times0.3=0.58$$

As a result, for the adjusted chroma signal R' supplied from the correction adjuster 44, the portion of R=G=B=0.9 has a higher level than the portion of R=1.0 and G=B=0 and hence it is not possible to mistakenly regard the portion represented by R=1.0 and G=B=0 as a highlight point. Consequently, even in such a case where an image includes a bright red portion with a high chroma saturation, the correction in the gradation correctors 14R, 14G and 14B does not result in an overcorrection, which prevents the color balance from being lost.

As described above, by setting k to an appropriate value, the gradation correction required for the input video signals due to the difference in conditions when an object is shot can be correctly accomplished, the scene dependency is minimized, and hence the recorded picture thus obtained is free from an unnatural appearance.

In addition, as described above, if the operator confirms an image displayed on the video monitor 80 to adjust the value of k, the degree of the color correction can be arbitrarily adjusted to achieve the optimal gradation correction according to the image.

Although the embodiments have been described with reference to a method and an apparatus applied to an image recording system, the method of and the apparatus for processing an image according to the present invention is not limited to a system recording a visual image on an image recording medium, namely, the method and the apparatus can be used to process various images displayed on a CRT.

While the present invention has been described with reference to the particular illustrative embodiments, it is not restricted by those embodiments but only by the appended claims. It is to be appreciated that those skilled in the art can change or modify the embodiments without departing from the scope and spirit of the present invention.

What is claimed is:

1. A method of image processing input video signals based on lookup table data to produce gradation corrected output signals comprising the steps of:
   receiving input video signals and establishing highlight points and shadow points for each of the input video signals based on cumulative histograms generated from each input video signal;
   converting standard lookup table data LO through a functional transformation represented by an expression $$L(v) = S[c\ LO\{a(v+b)\} + d]$$

to attain lookup table data L(v) associated with the input video signals in which parameters a, b, c and d are determined by passing the function represented by the expression through the highlight points and the shadow points thus established; and
   effecting an image processing on the input video signals based on the lookup table data associated with the input video signals to produce said gradation corrected output signals.

2. A method in accordance with claim 1, wherein said image processing method is used in an image recording method which reproduces a visualized image on an image recording medium.

3. A method in accordance with claim 2, wherein said image processing converts, based on the lookup table data, the input video signals by use of the lookup table data into signals representing an intensity of light to be irradiated onto the image recording medium and achieves a gradation correction on the input video signals depending on a shooting condition under which the input video signals were obtained to produce a density signal.

4. A method in accordance with claim 1, wherein said standard lookup table data is a video gamma curve represented by an expression $D = -2.2 \log v$.

5. A method in accordance with claim 1, wherein said step for establishing the highlight points and the shadow points sets at least one of the highlight points and the shadow points based on at least two points on the cumulative histograms.

6. A method in accordance with claim 5, wherein said step for establishing the highlight points and the shadow points calculates the highlight point CH from an expression $$CH = C2(C2-C3)/(C1-C3) + C1(C1-C2)/(C1-C3)$$

in which C1, C2 and C3 respectively represent input video signal levels at points of frequencies 99%, 95% and 90% in the cumulative histograms.

7. A method in accordance with claim 6, wherein the values of said (C2-C3)/(C1-C3) and (C1-C2)/(C1-C3) each are ½ and the highlight point CH is calculated from an expression $CH = \frac{1}{2}(C2+C1)$.

8. A method in accordance with claim 1, further comprising the step of:
   buffer processing an input signal level change for minimizing a change in a signal level of the input video signals wherein
   the step for establishing the highlight points and the shadow points is achieved based on the input video signals for which the change in the signal level is reduced in the input signal level change buffer processing step.

9. A method in accordance with claim 8, wherein said input signal level change buffer processing step uses a sharpness circuit to change a sharpness coefficient set to the sharpness circuit, thereby smoothing the change in the signal level of the input video signals.

10. A method in accordance with claim 8, wherein said input signal level change buffer processing step is effected by use of a low-pass filter.

11. A method in accordance with claim 8, wherein said input signal level change buffer processing step reduces the change in the signal level only for a luminance signal included in the input video signals.

12. A method in accordance with claim 1, further comprising the step of
   effecting a color correction level adjustment on the input video signals, to produce output color correction level adjusted signals, wherein
   said step of establishing the highlight points and the shadow points is accomplished based on the signals for which the color correction level adjustment is effected in said color correction level adjusted signal producing step.

13. A method in accordance with claim 12, wherein said color correction level adjusted signal generating step is conducted on each chroma signal of the input video signals in consideration of a value of a signal representing a brightness of the input video signals in which the color correction level adjustment can be set to a desired degree.

14. A method in accordance with claim 13, wherein said color correction level adjusted signal generating step is conducted on each chroma signal C of the input video signals in consideration of a luminance signal Y of the input video signals to achieve the color correction level adjustment according to an expression $C' = kC + (1-k)Y$ in which the value of k is changed to control the degree of the color correction level adjustment.

15. A method in accordance with claim 14, wherein said color correction level adjusted signal producing step enables an operator to set the value of k through monitoring of a corrected image obtained by image processing.

16. A method in accordance with claim 15, wherein said value of k is beforehand set to 1 so that when the operator confirms that a highlight white does not exist in the corrected image, the value of k is changed to a smaller value.

17. A method in accordance with claim 14, wherein said value of k is beforehand set to a middle point substantially between 1 and 0.

18. A method in accordance with claim 13, wherein said color correction level adjusted signal generating step is conducted on each chroma signal R, G and B of the input video signals in consideration of a value of a signal $\frac{1}{3}(R+G+B)$ representing a brightness of the input video signals in which the color correction level adjustment can be set to a desired degree.

19. An image processing apparatus comprising:
image processing means for effecting an image processing on input video signals based on lookup table data to produce output signals;
highlight point and shadow point establishing means for setting highlight points and shadow points of each of the input video signals;
standard lookup table storing means for storing standard lookup table data LO; and
lookup table converting means for converting the standard lookup table data LO through a functional transformation represented by an expression $L(v)=S[c\ LO\{a(v+b)\}+d]$ to attain lookup table data L(v) associated with the input video signals in which parameters a, b, c and d are determined by passing the function represented by the expression through the highlight points and the shadow points thus established, and delivering the obtained lookup table data to the image processing means;
said establishing means including cumulative histogram generating means for generating cumulative histograms from each input video signals, said highlight points and the shadow points being established based on the generated cumulative histograms.

20. An apparatus in accordance with claim 19, wherein said image processing means is used in an image recording system which reproduces a visualized image on an image recording medium.

21. An apparatus in accordance with claim 20, wherein said image processing means includes gradation correcting means storing the lookup table data to convert the input video signals by use of the gradation correcting means, into a signal representing an intensity of light to be irradiated onto the image recording medium and conducts a gradation correction on the input video signals according to a shooting condition under which the input video signals were obtained, thereby producing a density signal.

22. An apparatus in accordance with claim 19, wherein said standard lookup table data is a video gamma curve represented by an expression $D=-2.2\text{Log } v$.

23. An apparatus in accordance with claim 19, wherein said highlight point and shadow point establishing means sets at least either the highlight points or the shadow points based on at least two points on the cumulative histograms.

24. An apparatus in accordance with claim 23, wherein said highlight point and shadow point establishing means calculates the highlight point CH from an expression $$CH=C2(C2\text{-}C3)/(C1\text{-}C3)+C1(C1\text{-}C2)/(C1\text{-}C3)$$

in which C1, C2 and C3 respectively represent input video signal levels at points of frequencies 99%, 95% and 90% in the cumulative histograms.

25. An apparatus in accordance with claim 24, wherein said (C2-C3)/(C1-C3) and (C1-C2)/(C1-C3) each are $\frac{1}{2}$ and the highlight point CH is calculated from an expression $CH=\frac{1}{2}(C2+C1)$.

26. An apparatus in accordance with claim 19, further comprising:
input signal level change buffer processing means for minimizing a change in a signal level of the input video signals wherein
said highlight point and shadow point establishing means sets the highlight points and the shadow points based on the input video signals for which the change in the signal level is reduced by said input signal level change buffer processing means.

27. An apparatus in accordance with claim 26, wherein said input signal level change buffer processing means includes sharpness circuits loaded with variable sharpness coefficients, said sharpness circuit being capable of smoothing the change in the signal level of the input video signals.

28. An apparatus in accordance with claim 26, wherein said input signal level change buffer processing means includes low-pass filters.

29. An apparatus in accordance with claim 26, wherein said input signal level change buffer processing means effects processing to reduce the change in the signal level only for a luminance signal included in the input video signals.

30. An apparatus in accordance with claim 19, further comprising:
color correction level adjusting means for receiving the input video signals to effect a color correction level adjustment on the input video signals, thereby producing output signals, wherein
said highlight point and the shadow point establishing means sets the highlight points and the shadow points based on the signals for which the color correction level adjustment is effected in said color correction level adjusting means.

31. An apparatus in accordance with claim 30, wherein said color correction level adjusting means effects the color correction level adjustment on each chroma signal of the input video signals in consideration of a value of a signal representing a brightness of the input video signals in which the color correction level adjustment can be set to a desired degree.

32. An apparatus in accordance with claim 31, wherein said color correction level adjusting means effects the color correction level adjustment on each chroma signal C of the input video signals in consideration of a luminance signal Y of the input video signal according to an expression $C'=kC+(1\text{-}k)Y$ in which the value of k is changed to control the degree of the color correction level adjustment.

33. An apparatus in accordance with claim 32, wherein said color correction level adjusting means enables an operator to set the value of k to be used for the color correction level adjustment through monitoring of an image corrected by said gradation correcting means.

34. An apparatus in accordance with claim 33, wherein said value of k is beforehand set to 1 so that when the operator confirms that a highlight white does not exist in the image corrected by said gradation correcting means, the value of k is changed to a smaller value.

35. An apparatus in accordance with claim 32, wherein said value of k is set to a point substantially between 1 and 0.

36. An apparatus in accordance with claim 31, wherein said color correction level adjusting means conducts the color correction level adjustment on each chroma signal R, G and B of the input video signals in consideration of a value of a signal $\frac{1}{3}(R+G+B)$ representing a brightness of the input video signals in which the color correction level adjustment can be set to a desired degree.

* * * * *